3,177,652
IGNITION SYSTEM FOR PROPELLANTS
Bernard Lewis, Pittsburgh, Pa., assignor to Ethyl Corporation, New York, N.Y., a corporation of Virginia
No Drawing. Filed Feb. 27, 1961, Ser. No. 91,649
4 Claims. (Cl. 60—35.4)

This invention relates to rocket propulsion and, more particularly, to an improved method of igniting solid propellant rocket motors.

The solid propellants used in rocket propulsion are non-spontaneously ignited and, therefore, external energy must be supplied to initiate the combustion. The solid propellant and the combustion chamber are designed so that a proper burning rate is achieved at somewhat fixed pressures and temperatures. The starting procedure is very critical for under certain conditions, improper ignition may cause an abnormally high chamber pressure, possibly leading to a violent explosion. Even short of a violent explosion, an extremely high rate of pressure rise may stress and fracture the propellant grain resulting in failure of the motor to function properly. Under other conditions, improper initiation may cause the ignition pressure to be too low and proper ignition and performance of the propellant may not take place. Therefore, it is of utmost importance to reliably initiate combustion of the igniter material and the solid propellant so that the rocket motor may achieve its objective.

Various ignition systems incorporating pyrotechnic materials have been proposed to initiate combustion of solid propellants. However, these systems have certain inherent undesirable characteristics. With many of these systems, a series of events must take place in order for the propellant grain to eventually ignite. Usually, an electric current is used to generate heat which ignites a small amount of primer charge. The energy generated by this reaction, in turn, ignites a larger volume of an igniter charge which in turn initiates combustion on the propellant grain surface. Usually, the igniter is put into the forward part of the combustion chamber so that ignition gases are caused to sweep past the grain surface thereby transmitting heat, and are then exhausted. The temperatures and pressure within the combustion chamber are increased and when sufficient energy is transferred to the propellant grain surface it ignites.

Factors determinative of the efficiency of such systems are the reliability of igniting the primer and ignition charges, and the heat transfer from the products of combustion to the grain surface proper. With such proposed systems each reaction is dependent upon the previous, and a failure or malfunction in any one of the steps results in a failure to properly ignite the propellant. Moreover, rather than initiating combustion over a desired area of the propellant grain, combustion may start in only random, localized areas, thus leading to an erratic pressure rise and improver ignition. Another disadvantage of these proposed systems is the difficulty in meeting design requisites to initiate propellant combustion and yet not exceed chamber pressure limitations. As pointed out above, excessive chamber pressure may stress and fracture the grain leading to improper performance during flight. Moreover, the inherent nature of the pyrotechnic materials used in these methods makes them temperature sensitive. Systems designed to function at one temperature may be ineffectual at a lower temperature, or produce excessive chamber pressures at higher temperatures.

It is an object of this invention to provide a new and improved method of initiating rocket propellant ignition. More specifically, it is an object of this invention to provide a novel, superior and more reliable method of igniting solid propellants.

According to this invention I provide a method of igniting a solid propellant grain whereby at least two chemicals are introduced into a solid propellant motor combustion chamber and and caused to react with each other in the combustion chamber area which includes the propellant grain surface and the free space contiguous thereto. The chemicals thus introduced into the combustion chamber and caused to react are hypergolic; that is, on contact with each other they produce spontaneous combustion. The hypergolic reaction which takes place within the defined area generates energy which is transmitted to the grain in sufficient amounts to cause the grain proper to ignite.

The hypergolic chemicals are kept apart from each other until just prior to the time of ignition. The time period from the initiating of the flow of chemicals to the ignition of the propellant grain varies over a fairly wide range. Factors determinative of this time period include the type of chemicals used, the rate at which they are introduced into the combustion chamber, and the rate of heat transfer to the grain surface. The time period is usually less than about 400 milliseconds, and oftentimes less than 100 milliseconds.

The chemicals may be stored in suitable containers located within or outside the combustion chamber. For maximum safety, the containers may in some operations be kept out of the vehicle until just prior to flight. In cases where the position of the containers within the vehicle is inaccessible, the empty containers may be positioned during the vehicle assembly and the hypergolic material introduced into the containers through a delivery line from an external source just prior to flight. The combustion chamber itself may also be used to contain gaseous hypergolic constituents. The chamber is sealed and gases such as air, oxygen, ozone, etc. are stored therein at atmospheric or at elevated pressures. Since in such cases one hypergolic constituent will be in contact with the propellant grain surface during storage, only gases that are compatible with and do not adversely affect grain properties can be stored in this manner.

The chemicals that make up the hypergolic systems of this invention may be put into two classes—a fuel constituent and an oxidizer constituent. The fuel constituent is a chemical or mixture of chemicals that is capable of supporting combustion. The oxidizer of this invention is a chemical or mixture of chemicals that is capable of acting as an oxidizing agent in a chemical reaction. The fuel and the oxidizer, when contacted with each other, must be capable of producing a hypergolic reaction which generates a sufficient amount of energy to ignite a solid propellant grain.

Hypergolicity is a specific property of a reaction system each reactant being mutually dependent upon the other for this property. Whereas a fuel may be hypergolic when contacted with a specific oxidizer, such is not necessarily the case when it is contacted with another oxidizing material. Reaction systems that have this property may be determined empirically with a minimum of effort. From the wide range of fuels and oxidizers available, various systems that have varying degrees of reactivity and energy release to conform with the requisites of igniting specific solid propellant grains may be used.

The method of this invention has among its advantages those of flexibility, simplicity, and reliability. Ignition of the propellant is not dependent upon a previous series of reactions, but ignition is caused directly by one prior reaction. Another advantage is that streams of the fuel and oxidizer may be dispersed so as to initiate combustion throughout the combustion chamber. In this manner, rather than localized ignition of the propellant grain, combustion is initiated over the total surface of the propellant grain. This type of ignition leads to a smooth, even pressure rise rather than to objectionable pressure peaks. Still other advantages of this invention are rapid and efficient heat transfer from the igniting material to the propellant grain. Because of the high heat of combustion of the metallic constituent, metal-oxidant systems develop extremely high flame temperatures. Thus, as compared with more conventional systems, a higher rate of heat transfer by convection and radiation is achieved. In addition, because of solid-to-solid contact, heat is efficiently transferred through conduction. The gaseous metal oxides resulting from the combustion process condense on the propellant grain thereby efficiently transferring sensible heat and heat of condensation directly to the propellant grain surface. Additional head is transferred by conduction as solid particles impinge on the grain surface.

The method of the present invention has the advantages of simplicity, reliability, efficient heat transfer, and safety, and yet is flexible so as to be adaptable to a wide range of applications. With a proper selection of the reaction system, the ignition requirements of a variety of rocket motors can be closely matched.

Any chemical or mixture of chemicals that is hypergolic when contacted with an oxidizing medium can be used as the fuel constituent of this invention. In other words, when the fuel is contacted with an appropriate oxidizing agent, spontaneous combustion must take place and sufficient energy must be liberated so as to ignite the propellant grain. Liquid hydrocarbons including petroleum naphthas, gasoline, jet fuel, distillate fuels, kerosene, etc. are appropriate fuels. Many organometallic compounds and organometallic halides also have this property and are useable in this invention. In addition, certain metal hydrides and alkyl metal hydrides, alkyl diboranes, alkyl boron amines, and alkyl triboron triamines, and hydrazine and related compounds also have this property and can be used.

Numerous organic and organic-halide compounds of the metals, boron, aluminum and zinc are hypergolic when contacted with an appropriate oxidizer. These compounds have the general formula:

$$R_yMX_z$$

where M is a metal selected from the class consisting of aluminum, boron, and zinc; R is a hydrocarbon radical containing up to about 6 carbon atoms and is selected from the class consisting of alkyl and aryl; X is a halogen atom; y is a small integer namely one, two or three; z is a small integer namely zero, one or two; and y+z is equal to the valence of the metal M. Examples of organometallic compounds are trimethylaluminum, triethylaluminum, tripropylaluminum, trimethylboron, tripropylboron, triethylboron, tribenzylborine, diethylzinc, dimethylzinc, dipropylzinc, dibutylzinc and the like. Examples of organometallic halides are dimethylboron bromide, diethylaluminum chloride, dimethylaluminum chloride, methylzinc chloride and the like.

One preferred group of the hypergolic fuels consists of the alkyl compounds of aluminum, zinc and boron. These have the general formula:

$$MR_z$$

where M is selected from the class consisting of aluminum, zinc and boron and R is an alkyl radical containing up to about 4 carbon atoms, and preferably containing from one to 2 carbon atoms, and z is a small whole integer equal to the valence of the metal M. The especially preferred compounds of this group include trimethylaluminum, triethylaluminum, trimethylboron, triethylboron and dimethylzinc. These compounds are especially preferred because of their respectively high stability and high degree of reactivity when contacted with a variety of oxidizing agents.

Another class of compounds that under certain conditions are hypergolic are metal hydride compounds, especially those of boron, aluminum, germanium, and beryllium. Although the use of hydrides that are normally liquid is preferred, the solid hydrides can also be used by forming a slurry, a solution, or a dispersion of such material. The boron hydrides, the most preferred of the hydrides, have the general formula:

$$B_yH_{y+4}$$

where y is an integer selected from the class consisting of 2, 4, 5, 6, and 10. Examples of such compounds are diborane, dihydrotetraborane, pentaborane, decaborane.

Alkyl metal hydrides are also a desirable fuel constituent of this invention. The most preferred of this group are the compounds of boron and aluminum having the general formula:

$$R_yMH_z$$

where R is an alkyl radical, M is selected from the class consisting of boron and aluminum, y is a small integer namely one or two, and z is a small integer namely one or two, and y+z is equal to the valence of the metal M. Examples of such compounds are dimethylaluminum hydride, diethylaluminum hydride, dimethylboron hydride, and diethylboron hydride.

Another group of compounds useable as the hypergolic fuel are the alkyl diboranes having the general formula:

$$R_xB_2H_{6-x}$$

where R is a lower alkyl group having from about one to three carbon atoms, and x is a small integer ranging from one to four. Examples of such compounds are methyldiborane, dimethyldiborane, ethyldiborane, diethyldiborane, methylethyldiborane, and the like.

Still other materials that are useable as the hypergolic fuel are the alkyl boron amines. These have the general formula:

$$R_3NBR_3$$
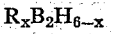

wherein R is selected from the class consisting of hydrogen and lower alkyl groups having up to about three carbon atoms. Examples of such compounds are dimethylborine trimethylamine; methylborine trimethylamine; ethylborine trimethylamine; methylethylborine ethyldimethylamine; etc.

Another class of boron compounds that are useable are the alkyl triboron triamines. These compounds have the general formula:

$$R_xB_3N_3H_{6-x}$$

wherein R is a lower alkyl group having up to about 3 carbon atoms in the molecule, and x is a small integer ranging from one to 4. Examples of such compounds are dimethyltriborine triamine; methyltriborine triamine; tetramethyltriborine triamine; trimethyltriborine triamine, etc.

Other materials that can be used are hydrazine and related compounds, especially the alkyl and mixed alkyl derivatives. Examples of such compounds are methylhydrazine, ethylhydrazine, and methylethylhydrazine.

Still other materials that have the property of being hypergolic and are useable in this invention are powdered metals and dispersions of metals such as magnesium, potassium, lithium, calcium, sodium, zinc, titanium, iron, aluminum, and nickel. Being finely divided, upon contact with an appropriate oxidizer, spontaneous combustion takes place. For example, finely divided iron upon contact with air or oxygen is hypergolic. Many materials
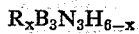

that are normally solid can be used as the fuel constituent of this invention by using them in a powdered form, in a slurry, or in solution in a solvent carrier. Also, materials that are normally gaseous can be used. In many instances it is very desirable to use a normally gaseous material but which has been liquefied by pressure or cooling or both. However, the most preferred compounds are those that are normally liquid because of the ease of handling and the need for high pressure and cooling equipment is minimized.

Any of the above enumerated materials or equivalents, or mixtures thereof may be used as the hypergolic fuel. Indeed, in many cases a mixture of materials is preferred so as to improve the overall characteristics of the fuel. For example, such materials as petroleum naphthas, distillate fuels, jet fuels, synthetic rubber and latex materials, polymers, may be mixed with organometallic compounds to provide a superior hypergolic fuel.

Any chemical or mixture of chemicals which when contacted with any of the above-named fuels or their equivalents produces a spontaneous combustion may be used as the oxidizer constituent of the hypergolic system. Examples of such materials are air, water vapor, oxygen, ozone, halogens, inter-halogen compounds, oxy- and nitroso-halogen compounds, nitrogen oxides, peroxides, peracids, and organic and inorganic acids.

Of the halogens, that is, fluorine, bromine, chlorine, and iodine, it is preferable to use fluorine since it is one of the most powerful oxidizers known capable of producing extremely high flame temperatures.

Inter-halogen compounds or mixtures thereof may be used as the oxidizer constituent. Specifically, chlorine trifluoride, bromine trifluoride or mixtures thereof are well suited for this application. These materials, though powerful oxidizing agents, are less reactive than liquid fluorine and are preferred for certain applications wherein the combination of a powerful oxidizer and maximum handling ease is required.

Examples of oxy-nitroso halogen compounds that can be used are nitrosyl chloride, nitrosyl bromide, and nitrosyl fluoride. Oxy-halogens such as the mono-, di-, tetra-, and heptoxides of chlorine, and the oxides of bromine and fluorine can be used. Also, all oxides of nitrogen can be used as the oxidizing material. These include nitrous oxide, nitric oxide, nitrogen trioxide, nitrogen tetraoxide and nitrogen pentoxide.

Additional compounds that are useable as the oxidizing constituent are peroxides such as hydrogen peroxide and organic liquid peroxy compounds such as peracetic acid. Other appropriate oxidizing materials include inorganic peracids such as persulfuric acid and perchloric acid. Strong inorganic acids such as sulfuric acid and nitric acid may also be used as the oxidizer. Especially preferred is red fuming nitric acid.

As previously discussed, hypergolicity is a specific property of a reaction system each reactant being mutually dependent upon the other for this property. It, therefore, should be pointed out that not all of the enumerated fuels when contacted with any oxidizer will produce a hypergolic reaction. For example, water vapor produces a hypergolic reaction only when contacted with a relatively few of the enumerated fuels, whereas contacting chlorine trifluoride with most, if not all of the enumerated fuels, produces a hypergolic reaction. Moreover, different systems show varying degrees of hypergolicity, with the attendant release of different rates and amounts of energy. Reaction systems that are capable of producing a hypergolic reaction may be determined empirically with a minimum of effort. A great number of systems that are hypergolic are possible, and the person skilled in the art will appreciate which are most desirable for a specific application.

The following examples are not meant to limit the scope of the hypergolic systems of this invention, but to show some of the preferred hypergolic systems.

| Example | Fuel | Oxidizer |
|---|---|---|
| 1 | Triethylaluminum | Air. |
| 2 | ---do--- | Oxygen. |
| 3 | ---do--- | Fluorine. |
| 4 | ---do--- | Chlorine trifluoride. |
| 5 | ---do--- | Nitrosyl chloride. |
| 6 | ---do--- | Hydrogen peroxide. |
| 7 | ---do--- | Peracetic acid. |
| 8 | ---do--- | Red fuming nitric acid. |
| 9 | Triethylboron | Oxygen. |
| 10 | ---do--- | Fluorine. |
| 11 | ---do--- | Chlorine trifluoride. |
| 12 | ---do--- | Hydrogen peroxide. |
| 13 | Diethylzinc | Oxygen. |
| 14 | ---do--- | Chlorine. |
| 15 | ---do--- | Fluorine. |
| 16 | ---do--- | Peracetic acid. |
| 17 | ---do--- | Red fuming nitric acid. |
| 18 | Methylzinc chloride | Oxygen. |
| 19 | ---do--- | Fluorine. |
| 20 | ---do--- | Nitrosyl chloride. |
| 21 | ---do--- | Hydrogen peroxide. |
| 22 | Dimethylaluminum chloride | Oxygen. |
| 23 | ---do--- | Fluorine. |
| 24 | ---do--- | Chlorine trifluoride. |
| 25 | ---do--- | Nitrosyl chloride. |
| 26 | ---do--- | Hydrogen peroxide. |
| 27 | Dimethyldiborane | Oxygen. |
| 28 | ---do--- | Fluorine. |
| 29 | ---do--- | Hydrogen peroxide. |
| 30 | ---do--- | Peracetic acid. |
| 31 | Trimethylaluminum | Oxygen. |
| 32 | ---do--- | Ozone. |
| 33 | ---do--- | Hydrogen peroxide. |
| 34 | ---do--- | Red fuming nitric acid. |
| 35 | ---do--- | Peracetic acid. |
| 36 | Trimethylboron | Oxygen. |
| 37 | ---do--- | Fluorine. |
| 38 | ---do--- | Hydrogen peroxide. |
| 39 | ---do--- | Peracetic acid. |
| 40 | Dimethylboron bromide | Fluorine. |
| 41 | ---do--- | Chlorine trifluoride. |
| 42 | ---do--- | Oxygen. |
| 43 | ---do--- | Hydrogen peroxide. |
| 44 | Diborane | Oxygen. |
| 45 | ---do--- | Bromine. |
| 46 | ---do--- | Fluorine. |
| 47 | ---do--- | Chlorine trifluoride. |
| 48 | ---do--- | Red fuming nitric acid. |
| 49 | Dimethylaluminum hydride | Oxygen. |
| 50 | ---do--- | Chlorine. |
| 51 | Methyldiborane | Oxygen. |
| 52 | ---do--- | Ozone. |
| 53 | ---do--- | Chlorine. |
| 54 | ---do--- | Chlorine trifluoride. |
| 55 | ---do--- | Hydrogen peroxide. |
| 56 | Cyclooctatetraene | Chlorine trifluoride. |
| 57 | Dicycloheptatriene | Red fuming nitric acid. |
| 58 | Dicycloheptadiene | Do. |
| 59 | 25 Vol. percent methylcyclopentadienyl manganese tricarbonyl +75 Vol percent jet fuel | Do. |
| 60 | Kerosene | Chlorine trifluoride. |
| 61 | Dimethylborine | Oxygen. |
| 62 | ---do--- | Fluorine. |
| 63 | ---do--- | Bromine trifluoride. |
| 64 | Dimethyltriborine triamine | Red fuming nitric acid. |
| 65 | ---do--- | Chlorine trifluoride. |
| 66 | ---do--- | Ozone. |
| 67 | Methylcyclopentadienyl manganese tricarbonyl | Red fuming nitric acid. |
| 68 | ---do--- | Nitrogen tetroxide. |
| 69 | ---do--- | Chlorine trifluoride. |

The amounts of fuel and oxidizer that are required to ignite a solid propellant grain vary widely due to several factors. Factors determinative of this quantity include the composition, amount, and configuration of the propellant grain, the specific fuel-oxidizer system chosen, and the method of contacting the fuel and oxidizer in the combustion chamber. Ideally, the ignition system should bring the temperature and pressures within the combustion chamber to operating levels. Since different solid propellant systems are designed to operate at such widely ranging conditions as from about 50 to about 3000 p.s.i.a., and from about 2000 to 3000° K., there will be great variations in the quantities of hypergolic materials required. A variety of fuels and oxidizers are available to form hypergolic systems with widely ranging heat transfer properties. From this group the user will be able to select a system that has the specific properties most desirable for a given application.

As to the amount of energy required to ignite the propellant grain, it will be recognized that different materials require different energy levels before ignition takes place. However, with the type propellants in current use from about 0.1 to 20 calories/sq. cm. of propellant grain surface is oftentimes adequate for ignition. Variations within this range will be dependent upon the rate of heat transfer to the grain. Amounts much less than the above minimum may not lead to adequate ignition whereas energy transfer of much more than 20 calories/sq. cm. may lead to excessive rates of pressure rise or even to detonation. Of course, the above stated limits are subject to change as newer propellant grains and propellant combustion chambers are designed.

The time required for the transfer of the stated amount of energy to the propellant grain may vary from about 1 to about 300 milliseconds. Systems having a relatively high rate of heat transfer require less energy for ignition than do systems having a relatively lower rate of heat transfer.

The relative amounts of fuel and oxidizer vary dependent upon the specific reaction system. In many cases the use of proportions somewhat near those stoichiometrically required are preferred.

Any appropriate system may be used to introduce the hypergolic fluid and the oxidizer into the rocket combustion chamber. Requisites are fast and intimate contact of the two materials so as to produce an immediate, uniform reaction. Methods of introducing the reactants into the combustion chamber include pressure vessels for containing the reactants, the use of an inert gas to develop pressure within the vessels, an opening means such as a valve, and an outlet such as spray nozzles to disperse the reactants into the combustion chamber. Within this method many variations are possible. The following examples will serve to illustrate some of these possibilities.

*Example 70*

In this example triethylaluminum is the igniter fuel and oxygen is the oxidizer. The propellant grain is cylindrical in shape, having a hollowed center portion within which the ignition reaction takes place. The grain is composed of a mixture of about 25 weight percent asphalt, 73 percent ammonium perchlorate and 2 percent miscellaneous additives and inhibitors. As fabricated, the solid propellant grain is firmly positioned in the rocket motor case.

The igniter fuel, triethylaluminum, is contained in a closed vessel which is mounted on the forward end of the rocket motor and extends inward into the hollowed central portion of the grain. Pressure of about 100 lb./sq. inch abs. is developed within the vessel by means of a compressed nitrogen cartridge attached to the igniter fuel vessel. The vessel has an outlet in the form of a spray nozzle which is preceded by a valve.

The oxidizer, gaseous oxygen, is contained in a tank under pressure of about 200 lb./sq. inch abs. This tank is also mounted on the forward end of the motor case and has an outlet orifice preceded by a valve.

The opening of the valves for both the fuel vessel and the oxidizer tank is accomplished by hydraulic pressure. Both valves have sliding plates, which in their forward position, completely seal the valve ports. A hydraulic pressure line is connected to the sliding plates whereby increasing the hydraulic pressure causes the sliding plate to move, thereby opening the valve. The reactants within the vessels under pressure are both forced through the orifice and nozzle openings and dispersed in the combustion chamber.

The spray nozzle of the igniter fuel container is directed so as to disperse the igniter fuel uniformly throughout the combustion chamber and upon the propellant grain. By simultaneously opening the valves, the fuel and oxidizer, both under pressure, are caused to enter the combustion chamber. Upon contacting each other, spontaneous combustion takes place within the hollow cavity and also on the propellant grain surface. The hot gases and the solid particles resulting from the combustion contact a major portion of the propellant grain surface. Heat is transferred to the propellant grain by convection, radiation, and conduction from the reaction products and reacting mass both on the propellant surface and within the cavity. Also, some reaction vapors condense on the grain surface, thereby liberating heats of vaporization and fusion to the grain surface. Additional heat transfer is accomplished by impingement of solid hot particles on the grain surface. When the pressure developed in the combustion chamber reaches the level at which the rocket is designed to operate, the supply of igniter fuel is discontinued. This is accomplished by a pressure sensitive element in the combustion chamber which through hydraulic pressure causes the valve to close when the desired chamber pressure is reached. The reaction on the grain surface is now self-sustaining and controlled combustion proceeds in accordance with the properties of the specific propellant grain and the design of the rocket motor.

*Example 71*

In this example a mixture of 85 weight percent triethylboron and 15 percent triethylaluminum is the igniter fuel, and chlorine trifluoride is the oxidizer. As in Example 70, the cylindrical, hollowed propellant grain is positioned in the rocket motor case. The grain is composed of 53 percent nitrocellulose, 45 percent nitroglycerin, and 2 percent of miscellaneous additives, inhibitors, etc.

Two pressure vessels containing respectively the igniter fuel mixture and the oxidizer are mounted on the forward end of the combustion chamber. A nitrogen cartridge is attached to each vessel so that the fuel mixture is under 150 pounds per square inch pressure, and the liquefied chlorine trifluoride is under 250 pounds per square inch pressure. Each vessel has an outlet and a sliding plate valve attached thereto. A spray bar attached to each valve extends throughout the cylindrical combustion chamber parallel to the chamber axis. The spray bars consist essentially of long, one-fourth inch diameter metal pipes, capped on their extreme ends and having small perforations all along their lengths.

The valves are simultaneously opened by remote control, and the pressurized fuel mixture and oxidizer are forced through the perforations of the respective spray bars. The reactants thus are sprayed in the form of a fine mist into the combustion chamber. Upon contact with each other, spontaneous combustion takes place. In a manner similar to that of Example 70 heat is transferred to the propellant grain surface, and as pressure and temperature reach the required levels, the propellant grain surface ignites.

It will be understood that I do not intend to be restricted to the above-described modes of carrying out the method of this invention. It is apparent that there are many variations of the above-described system without substantial deviation from the true intent. For example, the spray nozzle need not be attached directly to the vessel but may be attached to a pipe or hose, etc. which is in turn connected to the vessel. Also, there are many variations with respect to ejecting and spraying the liquids into the combustion chamber. For example, it is sometimes desirable to use a number of spray nozzles to introduce the materials into the combustion chamber. Alternatively, one continuous spray bar such as a metallic pipe with a series of perforations may be used to spray the liquids. In this manner, a greater portion of the propellant grain may be contacted by the reactants.

An alternate method of bringing the hypergolic fuel and the oxidizer in contact incorporates two sealed vessels containing respectively appropriate amounts of the hypergolic fuel and the oxidizer. By appropriate means such as a small explosive charge or a puncture by a plunger, the vessels may be shattered allowing the materials to escape with subsequent intimate contact taking place.

As another alternative, a high-speed jet spray of the oxidizing material may be used to entrain the hypergolic fuel by jet action. The spray may be directed so as to spread rapidly throughout the combustion chamber. Similarly, using an inert gas such as nitrogen, hypergolic fuels such as powdered metals may be introduced into the combustion chamber.

With a preferred system, the hypergolic fuel is contacted with an oxidizer gas which is sealed in the combustion chamber proper. A vessel containing the hypergolic fluid is placed within the combustion chamber which is sealed and contains an oxidizing gas such as air or oxygen, ozone, etc. The vessel is punctured or shattered, and upon contact between the hypergolic fluid and the oxidizing media, spontaneous combustion takes place.

The methods of initiating the reaction are many and varied. The means for remotely controlling the opening of the vessel valves with subsequent contact of the reactants may be accomplished by electric, hydraulic, or purely mechanical energy. Electrical energy may be used to activate a solenoid which in turn opens the valves, or hydraulic pressure may be used to accomplish the same ends, or opening can be accomplished by energy applied to a cable or shaft attached to the valve. When using fragile containers, they may be fractured by similar means or by a small explosive charge remotely initiated. Also, appropriate mechanisms may be incorporated into the system whereby upon reaching a predetermined pressure, the valves automatically close.

In addition to pressure controls, provisions may be made for cooling or heating the vessels. Thus, by choosing the proper temperature and pressure for the system, materials that would normally be solid or gaseous may be converted to the liquid state. In this manner materials that would otherwise be precluded from use or subject to disadvantages may be effectively incorporated into the system.

This method of ignition may be used to ignite all types of solid propellant grains. The grains may be of the composite, or double base type, or a combination of these. The composite grains are composed of a mixture of a fuel and an oxidizer neither of which would burn satisfactorily without the presence of the other, whereas with a double base type, a chemical compound capable of combustion in the absence of all other material makes up the majority of the grain. The latter type is composed of materials such as nitroglycerin and nitrocellulose but usually have minor amounts of other additives used to control the physical and chemical properties of the total grain.

In the composite type grains, perchlorates of sodium, potassium, magnesium or ammonium are quite often used as the oxidizer portion. Other oxidizers that are often used are inorganic nitrates of potassium, sodium, and ammonium. The fuel portion of the composite propellant grain may be a petroleum-derived hydrocarbon such as asphalt or thermosetting plastics such as phenol formaldehyde, phenol furfural resins, non-thermosetting plastics such as polystyrene, polyurethanes, synthetic rubber, latex, and gum-like products.

In addition to the principal ingredients in the propellant grains, additives are used to improve specific grain properties. Minor amounts of additives are added to control the burning rate, increase chemical stability, control radiation absorption properties, improve physical properties such as mechanical strength and elasticity, minimize temperature sensitivity, and control various processing properties of the propellant during fabrication such as curing time, fluidity, etc.

I claim:

1. The method of igniting solid propellants which comprises contacting in a solid propellant combustion chamber a compound selected from the group consisting of:
   (A) Boron hydrides having the formula $$B_yH_{y+4}$$

where $y$ is an integer selected from the class consisting of 2, 4, 5, 6, and 10,
   (B) Alkyl metal hydrides having the formula $$R_yMH_z$$

where R is an alkyl radical, M is selected from the group consisting of boron and aluminum, $y$ is 1 or 2, $z$ is 1 or 2, and $y+z$ is equal to the valence of M,
   (C) Alkyl diboranes having the formula $$R_xB_2H_{6-x}$$

where R is a lower alkyl group and $x$ is a small integer from 1 to 4,
   (D) Alkyl boron amines having the formula $$R_3NBR_3$$

where R is selected from the group consisting of hydrogen, and lower alkyl groups,
   (E) Alkyl triboron triamines having the general formula $$R_xB_3N_3H_{6-x}$$

where R is a lower alkyl group and $x$ is a small integer from 1 to 4, and
   (F) Hydrazine and lower alkyl hydrazines, with a compound selected from the group consisting of air, water vapor, oxygen, ozone, halogens, chlorine trifluoride, bromine trifluoride, nitrosyl chloride, nitrosyl bromide, nitrosyl fluoride, chlorine monoxide, chlorine dioxide, chlorine tetraoxide, chlorine heptoxide, nitrogen oxides, hydrogen peroxide, peracetic acid, persulfuric acid, perchloric acid, organic acids, sulfuric acid and nitric acid, whereby spontaneous combustion of said compounds occurs on the propellant grain and in said combustion chamber, and transmitting sufficient energy to the propellant grain thereby causing said grain surface to ignite.

2. The method of claim 1 wherein one of said compounds has the formula $$R_yAlH_z$$

wherein R is a lower alkyl radical, $y$ is 1 or 2, $z$ is 1 or 2, and $y+z$ is equal to 3.

3. The method of claim 2 wherein diethylaluminum hydride is caused to react with oxygen.

4. The method of claim 2 wherein said compounds are present in amounts such that from 0.1 to about 20 calories per square centimeter of propellant surface are transmitted to said propellant grain.

References Cited by the Examiner

UNITED STATES PATENTS

| 2,775,863 | 1/57  | Traverse      | 60—35.4    |
| 2,940,999 | 6/60  | Stern et al.  | 60—35.4 XR |
| 2,974,484 | 3/61  | Cooley        | 60—35.4 XR |
| 2,988,876 | 6/61  | Walden        | 149—22 XR  |
| 3,057,763 | 10/62 | Hunt et al.   | 149—22     |

OTHER REFERENCES

Proell et al.: The Journal of Space Flight, vol 2, No. 1, January 1950, pages 1–9 incl.

Carpenter: Ind. & Eng. Chem., vol. 49, No. 4, April 1957, pages 42A–48A inclusive.

Chemical Abstracts, vol. 53 (1959), page 14, 461.

Smith: German application, 1,083,591, printed June 15, 1960, Kl. 46a67.

CARL D. QUARFORTH, *Primary Examiner.*

LEON D. ROSDOL, *Examiner.*